United States Patent [19]

Thompson et al.

[11] Patent Number: 4,548,374

[45] Date of Patent: Oct. 22, 1985

[54] ULTRASONIC SCANNING APPARATUS AND POSITIONING SYSTEM

[75] Inventors: Craig R. Thompson, Rancho Cordova; Ted F. Naumann, Jr., Shingle Springs, both of Calif.

[73] Assignee: General Electric Company, Milwaukee, Wis.

[21] Appl. No.: 290,837

[22] Filed: Aug. 7, 1981

[51] Int. Cl.[4] ............................ F16L 3/00; E04G 3/00
[52] U.S. Cl. ............................ 248/123.1; 248/280.1; 248/281.1
[58] Field of Search ............... 248/123.1, 280.1, 281.1, 248/292.1, 325, 530, 545, 585, 586, 587, 648, 122; 52/727, 728

[56] References Cited

U.S. PATENT DOCUMENTS

| 476,739 | 6/1892 | Flaherty | 248/292.1 |
|---|---|---|---|
| 911,935 | 2/1909 | Baumwart | 248/123.1 X |
| 1,140,051 | 5/1915 | MacNaughton-Jones | 248/123.1 |
| 1,711,768 | 5/1929 | Bausch et al. | 248/122 |
| 2,548,476 | 4/1951 | Horstman | 248/281.1 |
| 3,255,893 | 6/1966 | Hainer et al. | |
| 3,498,577 | 3/1970 | Mehr | 248/585 X |
| 3,783,262 | 1/1974 | Pile | 248/123.1 X |
| 4,065,976 | 1/1978 | Taenzer et al. | |
| 4,196,630 | 4/1980 | Rudolph | |
| 4,241,891 | 12/1980 | Rudolph | 248/280.1 X |
| 4,266,747 | 5/1981 | Souder | 248/280.1 |
| 4,344,595 | 8/1982 | Heller | 248/280.1 X |

FOREIGN PATENT DOCUMENTS

| 562676 | 12/1957 | Belgium | 248/123.1 |
|---|---|---|---|
| 23003 | 1/1981 | European Pat. Off. | 248/280.1 |
| 1077579 | 3/1960 | Fed. Rep. of Germany | . |
| 742471 | 3/1933 | France | 248/123.1 |
| 499061 | 1/1939 | United Kingdom | 248/123.1 |
| 554340 | 6/1943 | United Kingdom | 52/727 |
| 615384 | 1/1949 | United Kingdom | 248/123.1 |

OTHER PUBLICATIONS

"Durable Surf-Fishing Spike Made from Angle and Spike", Popular Mechanics, Apr. 1960, p. 180.

Primary Examiner—J. Franklin Foss
Attorney, Agent, or Firm—Flehr, Hohbach, Test, Albritton & Herbert

[57] ABSTRACT

Positioning apparatus for vertically moving a scanning assembly includes a vertical support, a first arm pivotally attached to the support and to the scanning assembly, and a second arm pivotally attached to the support and to the scanning assembly with the first and second arms being parallel. A counter-balance is provided and is attached to the support by third and fourth arms which are pivotally attached to the support and to the counter-balance.

3 Claims, 6 Drawing Figures

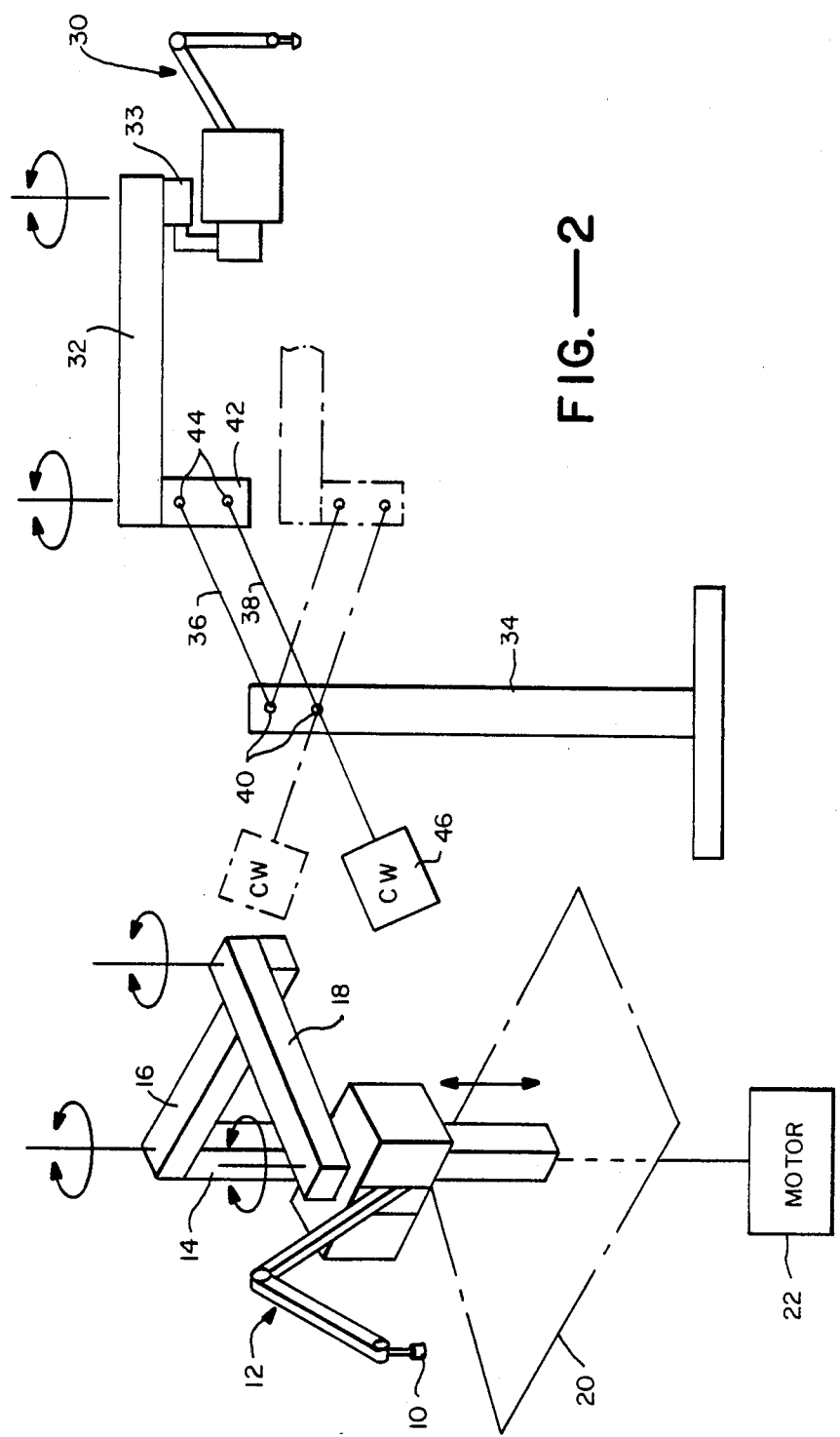

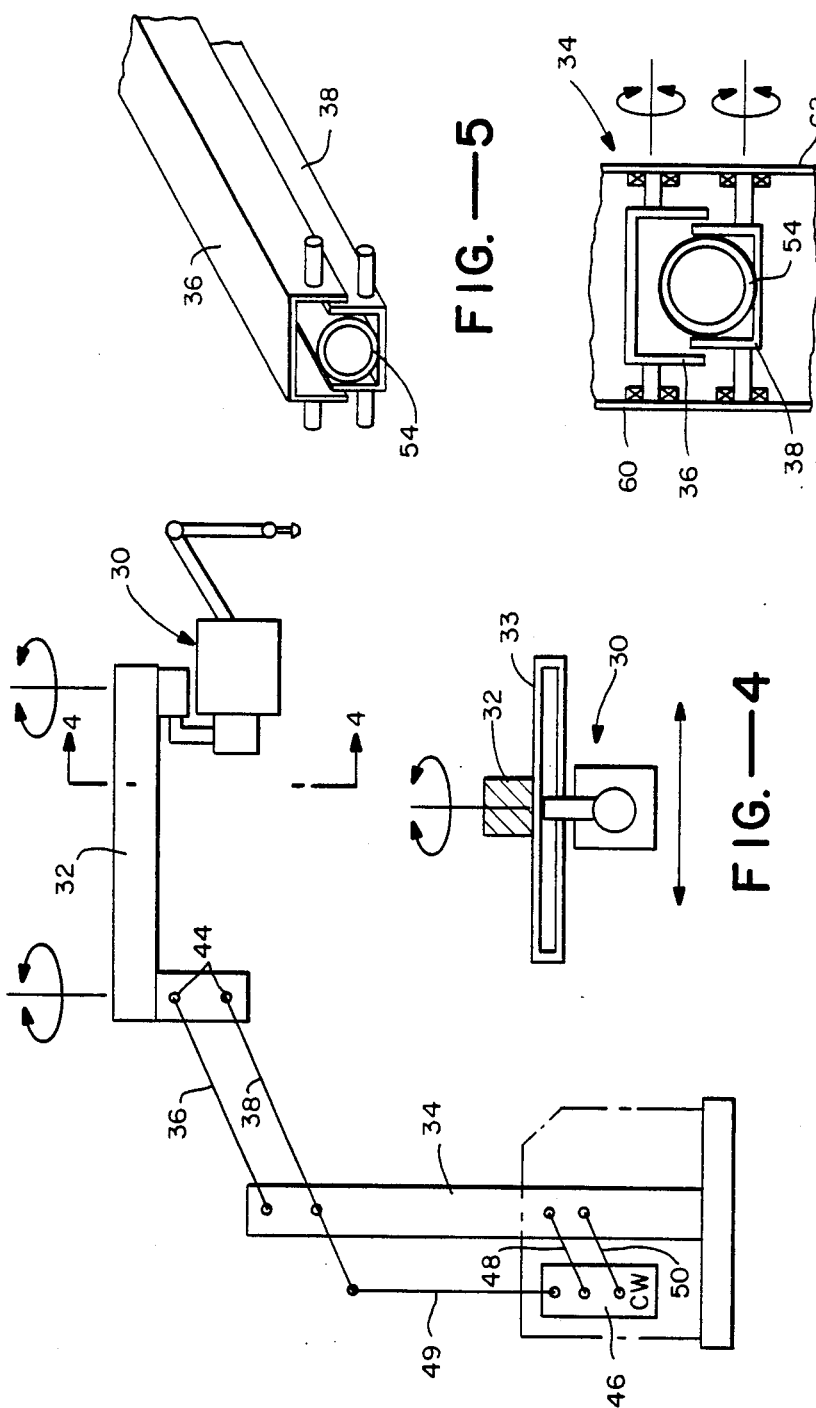

ULTRASONIC SCANNING APPARATUS AND POSITIONING SYSTEM

This invention relates generally to ultrasonic scanners such as used for medical diagnostic purposes, and more particularly the invention relates to an improved structure for positioning an ultrasonic scanner with respect to a patient.

Ultrasonic diagnostic systems are known and commercially available for diagnostic purposes. See for example U.S. Pat. No. 4,172,386 for "Video A Trace Display System for Ultrasonic Diagnostic System" and U.S. Pat. No. 4,204,433 for "Computerized Ultrasonic Scanner With Technique Select". The commercially available Datason ultrasound system of General Electric Company provides both real time and static images on a television display.

Briefly, such systems utilize sound transducers to transmit ultrasonic (e.g. on the order of several megahertz) waves into a patient and to receive echo signals. In one mode of operation, the transducer is attached to a plurality of hinged arms for movement in a single plane, and potentiometers associated with the hinged arms produce signals which identify the transducer position. Alternatively, a transducer arry or a hand held transducer can be used. The echo signals are applied to a time gain compensated amplifier to adjust the echo signals for attenuation in passing through the patient. The adjusted signals are then passed through an analog to digital conversion and video processing circuitry and thence to scan converter circuitry for display formatting. The display comprises a plurality of pixels in horizontal rows and vertical columns with each pixel having a brightness level in response to the input signal. Conventionally, the brightness is defined by a 32 level Gray-scale, hence the pixel brightness level requires a five bit digital code.

The transducer which transmits the ultrasonic wave into a patient and receives echos therefrom is typically mounted on an articulated arm which extends from a support column. Using the articulated arm assembly, the operator must be able to position the transducer over a patient easily and with accuracy. A common method of positioning the transducer in the horizontal plane is to use two horizontal support arms joined by vertical pivots between the support column and the articulated arm assembly. When the horizontal support arms are at full extension, the overhung load requires that the support column have a base support of sufficient size to prevent tipping over of the apparatus. Additionally, a vertical height adjustment is required in the apparatus. Mechanical methods of raising and lowering the assembly require mechanisms with high mechanical advantages which are often difficult or awkward to adjust. Counter-weighting using a cable and sheave normally require special fail-safe safety brakes. Power assisted systems which drive the vertical column present problems with patient safety.

Accordingly, an object of the present invention is an improved ultrasonic scanner.

Another object of the invention is an improved mechanical positioning assembly for use in an ultrasonic scanner and like apparatus.

Briefly, scanning apparatus in accordance with the invention includes a vertical support, a positionable scanning means, and first mechanical coupling means for attaching the positionable scanning means to the vertical support. The mechanical coupling means includes first and second linkages, means for pivotally attaching said first and second linkages to said vertical support, and means for pivotally attaching said first and second linkages to said positionable scanning means whereby said positionable scanning means can be moved vertically by pivoting said first and second linkages.

The scanning apparatus further includes counter-balance means attached to the vertical support and moveable with the first mechanical coupling means. In a preferred embodiment the counter-balance means is attached to the vertical support by second mechanical coupling means comprising third and fourth linkages, means for pivotally attaching the third and fourth linkages to the vertical support and means for pivotally attaching the third and fourth linkages to the counter-balance means. Preferably, the third linkage comprises an extension of the first linkage whereby the first coupling means and the second coupling means move in unison. Advantageously, the counter-balance load remains constant regardless of extension of the positionable scanning means.

In a preferred embodiment the first and second linkages comprise U-shaped brackets and the first linkage further includes a tubular support member within the U-shaped bracket for supporting torsion loads.

The invention and objects and features thereof will be more readily apparent from the following detailed description and appended claims when taken with the drawing, in which:

FIG. 1 is a diagrammatic perspective illustration of ultrasonic scanning apparatus.

FIG. 2 is a diagrammatic illustration of a side elevation of ultrasonic scanning apparatus and positioning system in accordance with the present invention.

FIG. 3 is a diagrammatic illustration of a side elevation of another embodiment of ultrasonic scanning apparatus and positioning system in accordance with the invention.

FIG. 4 is a diagrammatic illustration of the apparatus of FIG. 3 taken along the line 4—4.

FIG. 5 is a perspective view of a preferred embodiment of a portion of the positioning apparatus of FIG. 3.

FIG. 6 is an end view of the apparatus of FIG. 5.

Referring now to the drawings, FIG. 1 is a diagrammatic perspective illustration of ultrasonic scanning apparatus including a transducer 10 and articulted arm shown generally at 12 which are mounted to a vertical support column 14 by means of horizontal support arms 16 and 18. Typically, the support arms 16 and 18 are pivotally attached as indicated by the arrows whereby the transducer 10 and articulated arm 12 can be variably positioned in a horizontal plane. Typically, brakes are used at the pivot points to provide a stable scan plane.

The vertical support 14 must have a sufficient base support area shown generally at 20 to prevent a tipover of the apparatus when the horizontal arms 16 and 18 are fully extended. Further, the apparatus must have a mechanism for moving the transducer/articulated arm assembly vertically, and in the illustrated embodiment this is accomplished by a drive motor 22 which moves the vertical support 14 vertically. However, as above indicated, such power assisted systems present problems with patient safety. Other mechanical methods of raising and lowering the assembly require mechanisms with high mechanical advantages which are often difficult or awkward to adjust. Additionally, counter-weighting the assembly using a cable and sheave normally require special failsafe safety brakes.

FIG. 2 is a diagrammatic illustration of a scanning apparatus and positioning system in accordance with the present invention in which the transducers/articulated arm shown generally at 30 and the horizontal support arms 32, 33 are mounted to the vertical support 34 by means of parallel and equal length linkages 36 and 38 which are pivotally attached to the vertical support 34 as shown at 40 and pivotally attached to a bracket 42 depending from the support arm 32 as shown at 44. The parallel and equal length arms 36 and 38 together with the vertical post 34 and the bracket 42 comprises a four-bar linkage whereby the transducer/articulated arm assembly 30 can be moved vertically with the horizontal arms 32, 33 remaining horizontal as illustrated by dotted lines. In this diagrammatic illustration a suitable counterweight 46 is provided by an extension of the arm 38 to counterbalance the horizontal arms 32, 33 and the transducer/articulated arm assembly.

Advantageously, the system of FIG. 2 can be modified as shown in FIG. 3 whereby the counterweight is connected to the extension of linkage 38 by linkage 49 and is mounted to the vertical support 34 by a second four-bar linkage including the parallel and equal length arms 48 and 50 which are pivotally mounted to the counterweight 46 and the vertical post 34. Accordingly, the counterweight 46 can be positioned more closely to the floor thus lowering the center of gravity of the scanning apparatus. Moreover, because of the advantage obtained through use of the four-bar linkage whereby the effective center of gravity of the horizontally extended transducer/articulated arm assembly remains at the pivot points 44, the fixed base or "footprint" of the vertical support 34 is minimized.

FIG. 4 is an end view of the horizontal arms 32, 33 and assembly 30 in accordance with one embodiment in which the assembly 30 can move horizontally by sliding in the horizontal arm 33. Accordingly, it will be appreciated that torsion can be established through the horizontal arms 32, 33 to the linkage 36 and 38 when the assembly 30 is at either limit of travel in the horizontal arm 33.

FIG. 5 is a perspective view of a preferred embodiment of the arms 36 and 38 whereby the arms comprise U shaped channel bars. In addition, a cylindrical member 54 is fastened such as by welding the channel member 38 to withstand torsion transmitted to the linkage by the assembly 30, as described above with reference to FIG. 4.

FIG. 6 is an end view of the arms 36 and 38 of FIG. 5 in which the channels are suitably dimensioned whereby arm 38 partially rests within the channel of arm 36. The vertical support 34 comprises opposing parallel walls 60 and 62 with the arms 36 and 38 pivotally mounted to the inside surfaces of the walls 60 and 62, as illustrated.

By using the four-bar linkage the horizontal support arms can be raised and lowered while maintaining horizontal alignment. As shown in FIGS. 5 and 6 the lower connecting link can be designed to take the full moment load or torsion thereby allowing the upper link to carry only tension. Further, using a four-bar linkage for counterbalancing allows the counterbalance load to remain constant and closely mounted to the vertical support. Moreover, by placing the counterweight below the horizontal bars 32, 33 through use of tension link 49, the center of gravity of the assembly is significantly lowered. Accordingly, the articulated arm can be positioned both horizontally and vertically by applying minimal forces to a single point on the articulated arm support. While the invention has been described with reference to specific embodiments, the description is illustrated by the invention and is not to be construed as limiting the invention. Various modifications and applications may occur to those skilled in the art without departing from the true spirit and scope of the invention as defined by the appended claims.

What is claimed is:

1. Positioning apparatus for vertically moving a scanning assembly comprising a verticl support, a first arm pivotally mounted to said support and to said assembly, a second arm pivotally attached to said vertical support and to said assembly, said first and second arms being parallel, a counterweight and coupling means for coupling said counterweight to the vertical support, said coupling means comprising third and fourth arms each pivotally attached to said vertical support and to said counterweight, said third and fourth arms being parallel, and a fifth arm pivotally attached to said first arm and to said counterweight.

2. Scanning apparatus as defined in claim 1 wherein said first and second linkages comprise U-shaped brackets.

3. Scanning apparatus as defined in claim 2 wherein said first linkage further includes a tubular support member within said U-shaped bracket.

* * * * *